UNITED STATES PATENT OFFICE.

HERMANN VIETH, OF LUDWIGSHAFEN-ON-THE-RHINE, GERMANY, ASSIGNOR TO THE FIRM OF KNOLL AND COMPANY, OF LUDWIGSHAFEN-ON-THE-RHINE, GERMANY.

PHENOLPHTHALEIN DIISOVALERATE.

998,726. Specification of Letters Patent. Patented July 25, 1911.

No Drawing. Application filed December 21, 1908. Serial No. 468,638. (Specimens.)

*To all whom it may concern:*

Be it known that I, HERMANN VIETH, a subject of the German Emperor, residing at Ludwigshafen-on-the-Rhine, Germany, have invented a certain new and useful Phenolphthalein Di-isovalerate, of which the following is a specification.

Phenolphthalein, which has for some years been in use as an aperient, has the defect, that it is liable to produce internal pains, if taken by sensitive persons. It has been found, that this defect may be completely avoided by administering instead of phenolphthalein its divaleryl-acid ester. This ester has a much milder action, because by its use the anesthetic and antispastic action of valeric acid or its ester is at the same time brought into play. The effective dose is about 0.4 grams. The product is administered internally, for instance in the shape of tabloids.

Phenolphthalein di-isovalerate may be obtained: by treating phenolphthalein with the halids, anhydrids or esters of isovaleric acid; or by causing isovaleric acid to act on phenolphthalein in the presence of a condensing agent.

Example: 5 parts of phenolphthalein are heated with 6 parts of isovaleryl bromid on a water-bath, until the generation of hydrobromic acid is finished. The mass resulting from the reaction is dissolved in benzene and the solution shaken with a dilute solution of caustic soda. Instead of adding the benzene to the said mass it may be added to the raw materials as a diluent before the reaction. The benzene solution thus obtained is then separated from the residue, and the benzene is evaporated, leaving behind the desired ester, which may be then recrystallized from alcohol. The yield thus obtained is almost equal to the theoretical quantity. The process may be illustrated by the following equation:

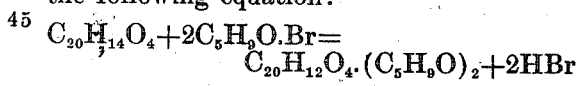

If instead of the bromid the corresponding quantity of chlorid is employed, it is advantageous to heat up to about 130° C., because the reaction takes place less easily than with the bromid. If a substance capable of separating the halogen-hydrogen compound, such as pyridin in approximately equivalent quantity, is added to the mixture subjected to the reaction, the latter takes place at ordinary temperature. The process may be modified also by shaking the alkaline solution of phenolphthalein with isovaleryl halid, according to Schotten-Baumann's reaction, during which process the material subjected to the reaction is preferably cooled. The same ester may be obtained also by heating instead of the isovaleryl halid the anhydrid or an ester of isovaleric acid with phenolphthalein, preferably to 200° C. with a small quantity of a substance capable of splitting up esters, such as caustic soda. Finally the desired ester of isovaleric acid may be obtained by treating a mixture of 2 molecules of isovaleric acid with one molecule of phenolphthalein with phosgen in the presence of pyridin.

Phenolphthalein di-isovalerate has the shape of a white crystalline powder, which unlike free phenolphthalein is easily soluble in benzene and chloroform. It is insoluble in a caustic soda solution, but when heated with the same it is gradually decomposed while imparting to the liquid a red color. Its melting point is about 110° C.

What I claim is:—

1. The process for the production of phenolphthalein di-isovalerate, which consists in treating phenolphthalein with a derivative of isovaleric acid, which contains the isovaleryl radical, washing the product of the reaction with a dilute solution of caustic soda and re-crystallizing.

2. The process for the production of phenolphthalein di-isovalerate, which consists in treating phenolphthalein with a halid of isovaleric acid, washing the product of the reaction with a dilute solution of caustic soda and re-crystallizing, substantially as described.

3. As a new product, phenolphthalein di-isovalerate, being a white crystalline powder melting at about 110° C., easily soluble in benzene and chloroform, insoluble in caustic soda solution, but undergoing gradual decomposition when heated with the
5 same while imparting to the liquid a red tint, and applicable as a mild aperient, substantially as described.

In testimony whereof I have hereunto set my hand in presence of two subscribing witnesses.

HERMANN VIETH.

Witnesses:
   ALBERT KNOLL,
   HERMANN TAEGER.